(12) United States Patent
Lee et al.

(10) Patent No.: US 10,940,568 B2
(45) Date of Patent: Mar. 9, 2021

(54) 5-AXIS MACHINING CENTER

(71) Applicant: HYUNDAI WIA CORPORATION, Changwon-si (KR)

(72) Inventors: Dal-ho Lee, Seoul (KR); Je-wang Kim, Gyeongsangbuk-do (KR); Dennis Korff, Bibensheim (DE); Sebastian Spengler, Bischofsheim (DE); Erik Nowak, Mannheim (DE); Behzad Jalizi, Griesheim (DE); Marc Sieber, Stadecken-Elsheim (DE); Johannes Hoerner, Darmstadt (DE); Thomas Schneider, Riedstadt (DE); Sang-mook Han, Seoul (KR)

(73) Assignee: HYUNDAI WIA CORPORATION, Changwon-si (KR)

( * ) Notice: Subject to any disclaimer, the term of this patent is extended or adjusted under 35 U.S.C. 154(b) by 0 days.

(21) Appl. No.: 16/468,668

(22) PCT Filed: Jul. 20, 2017

(86) PCT No.: PCT/KR2017/007813
§ 371 (c)(1),
(2) Date: Jun. 11, 2019

(87) PCT Pub. No.: WO2018/174344
PCT Pub. Date: Sep. 27, 2018

(65) Prior Publication Data
US 2020/0078888 A1 Mar. 12, 2020

(30) Foreign Application Priority Data

Mar. 24, 2017 (KR) ........................ 10-2017-0037701

(51) Int. Cl.
*B23Q 1/46* (2006.01)
*B23C 1/02* (2006.01)
(Continued)

(52) U.S. Cl.
CPC .................. *B23Q 1/46* (2013.01); *B23C 1/02* (2013.01); *B23C 9/00* (2013.01); *B23C 1/14* (2013.01);
(Continued)

(58) Field of Classification Search
CPC . B23Q 1/46; B23Q 5/22; B23Q 5/225; B23Q 5/326; Y10T 409/309576;
(Continued)

(56) References Cited

U.S. PATENT DOCUMENTS 4,309,809 A * 1/1982 Yokoe .................. B23B 31/261
29/26 A
4,333,363 A * 6/1982 Inaba ..................... B23Q 16/10
74/813 C
(Continued)

FOREIGN PATENT DOCUMENTS

JP 09-220236 A 8/1997
JP 10-286734 A 10/1998
(Continued)

OTHER PUBLICATIONS

International Search Report for PCT/KR2017/007813 dated Nov. 17, 2017 from Korean Intellectual Property Office.

*Primary Examiner* — Alan Snyder
*Assistant Examiner* — Yasir A Diab
(74) *Attorney, Agent, or Firm* — Revolution IP, PLLC

(57) ABSTRACT

The present invention relates to a machining center, and more particularly, to a machining center which allows a bed and a column to be integrated, thereby being capable of reducing the overall size of the apparatus and saving production costs and allows vibrations and displacements occurring in each of 5 axes to be rapidly transmitted to other (Continued)

axes to minimize relative vibrations and displacements between the axes, thereby being capable of performing high-precision machining.

1 Claim, 4 Drawing Sheets

(51) Int. Cl.
*B23C 9/00* (2006.01)
*B23C 1/14* (2006.01)

(52) U.S. Cl.
CPC ......... *B23C 2220/32* (2013.01); *Y10T 408/91* (2015.01); *Y10T 409/309576* (2015.01)

(58) Field of Classification Search
CPC ......... Y10T 408/91; B23C 1/02; B23C 1/025; B23C 1/027; B23C 1/14; B23C 9/00; B23C 9/005; B23C 2220/32
See application file for complete search history.

(56) References Cited

U.S. PATENT DOCUMENTS

| | | | |
|---|---|---|---|
| 4,484,387 A * | 11/1984 | Nachmany | B23Q 1/01 409/137 |
| 4,510,668 A | 4/1985 | Ishida et al. | |
| 7,364,391 B1 * | 4/2008 | Stadtfeld | B23F 5/207 409/2 |
| 7,794,186 B2 * | 9/2010 | Peiffer | B23F 23/12 409/8 |
| 8,066,548 B1 * | 11/2011 | Elie | B23Q 1/015 451/11 |
| 2003/0040258 A1 * | 2/2003 | Stadtfeld | B23F 9/025 451/8 |
| 2005/0260050 A1 * | 11/2005 | Ribbeck | B23Q 1/621 409/39 |
| 2008/0213057 A1 * | 9/2008 | Betschon | B23Q 1/54 29/27 C |
| 2009/0160388 A1 * | 6/2009 | Zagromski | B23Q 11/0089 318/570 |
| 2011/0018184 A1 | 1/2011 | Steger | |
| 2015/0111470 A1 * | 4/2015 | McGlasson | B23F 19/02 451/5 |
| 2015/0224616 A1 * | 8/2015 | Miquel | B23C 3/16 409/131 |
| 2015/0367472 A1 * | 12/2015 | Suzuki | B23Q 1/015 409/134 |

FOREIGN PATENT DOCUMENTS

| | | |
|---|---|---|
| KR | 10-0971168 B1 | 7/2010 |
| KR | 10-2010-0102183 A | 9/2010 |

\* cited by examiner

-- Prior Art --

[FIG. 2]
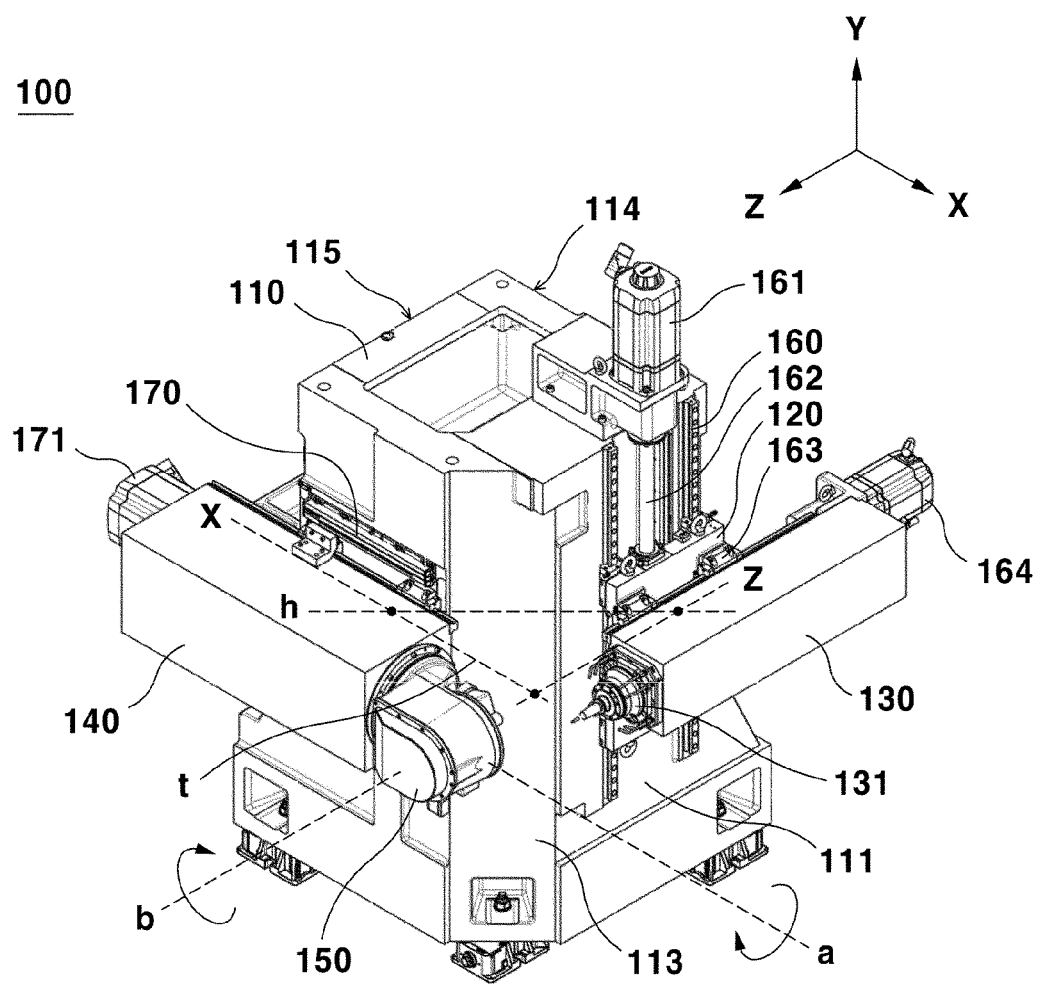

[FIG. 3]
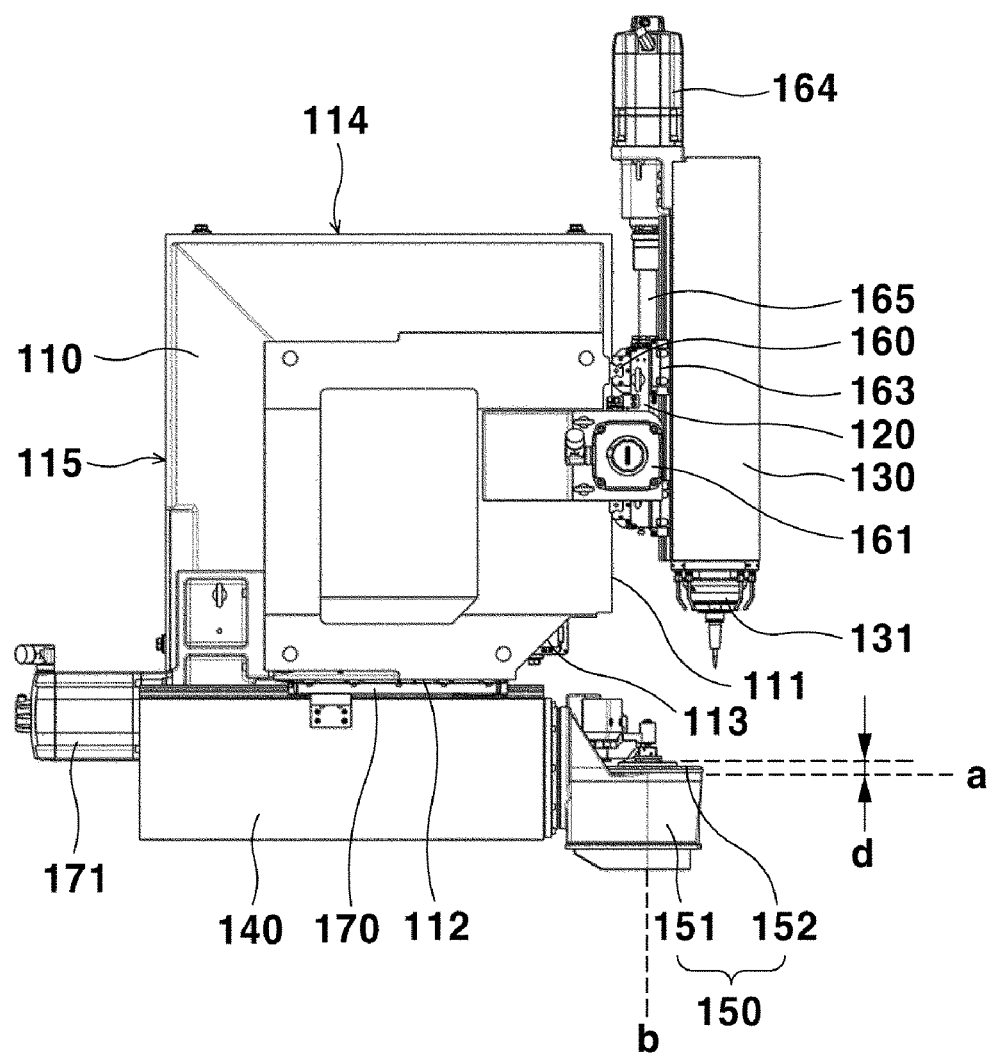

[FIG. 4]
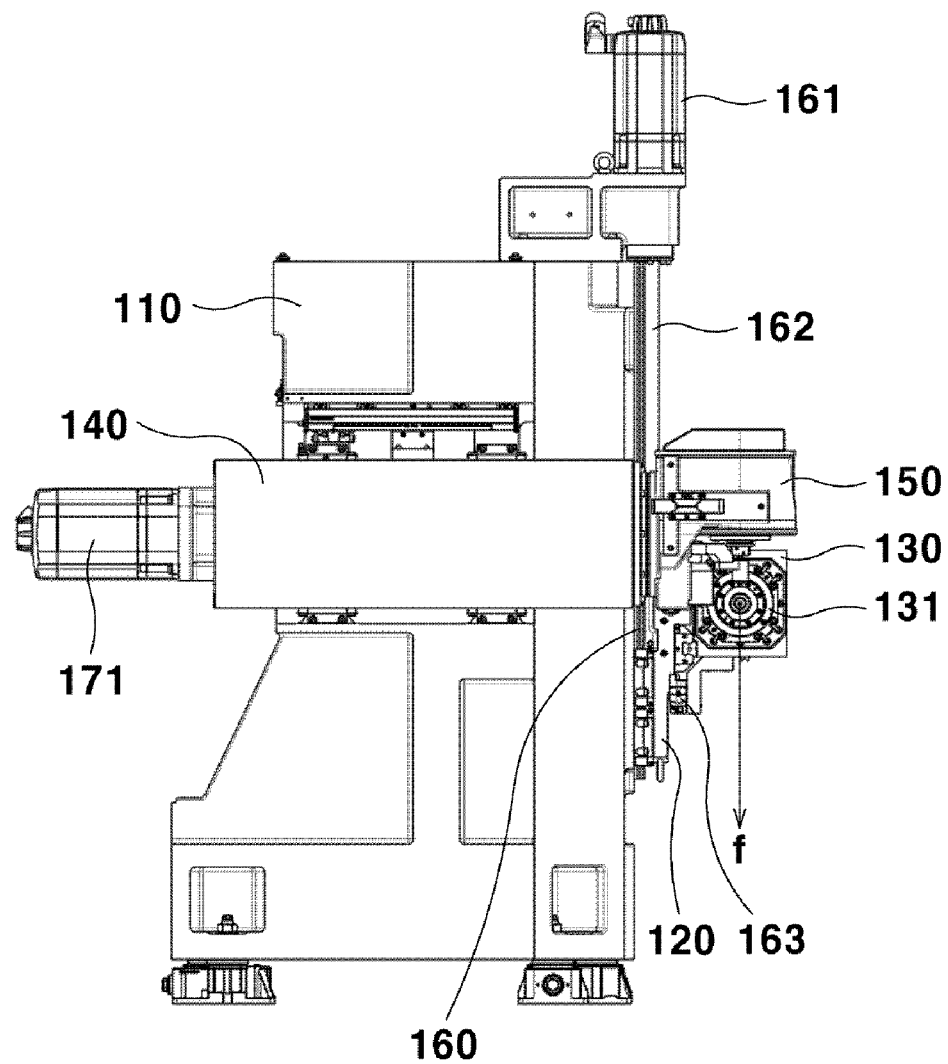

5-AXIS MACHINING CENTER

TECHNICAL FIELD

The present invention relates to a 5-axis machining center, and more particularly, to a 5-axis machining center which allows a bed and a column to be integrated, thereby being capable of reducing the overall size of an apparatus and saving production costs and allows vibrations and displacements occurring in each of 5 axes to be rapidly transmitted to other axes to minimize relative vibrations and displacements between the axes, thereby being capable of performing high-precision machining.

BACKGROUND ART

In general, machining centers are processing machines for processing a workpiece using a spindle moving in three axes.

Further, machining centers have a table for rotating a workpiece around a rotation axis and a tilting axis perpendicular to the rotation axis for 5-axis machining and allows a spindle to move in three axes and the workpiece to move in two axes, thereby being capable of performing machining in a total of 5 axis directions.

Such machining centers capable of performing 5-axis machining are also commonly referred to as 5-axis processing machines.

FIG. 1 is a view showing a conventional 5-axis machining center.

Referring to FIG. 1, a conventional 5-axis machining center 10 has a bed 11 placed on the ground, a column 12 erected on the bed 11, a spindle 13 provided on the column 12, vertically movable on the column 12 in a Y-axis direction, and capable of mounting a tool for machining a workpiece, and a table 14 having the workpiece placed thereon, capable of rotating the workpiece about a rotation axis b, and capable of tilting the workpiece around a tilting axis a perpendicular to the rotation axis b.

Further, although not illustrated, a saddle allowing the column 12 to be movable on an X- and Y-axis plane is provided between the bed 11 and the column 12.

That is, since the spindle 13 is linearly movable on the X axis, the Y axis, and a Z axis, and the workpiece is rotatable around the rotation axis b and the tilting axis a, the workpiece can be machined in 5 axes.

Meanwhile, the dynamic performance of the conventional 5-axis machining center 10 needs to be increased to reduce interference with other structures in a machining area since the column 12 is separated from the bed 11, and the spindle 13 is required to move on three axes.

Additional equipment is inevitably added to increase the dynamic performance. Accordingly, there are problems in that the price of the apparatus increases and that the volume becomes large.

Moreover, the conventional 5-axis machining center 10 has a problem in that, since the column 12 and the bed 11 are separated from each other, vibrations or (thermal) displacements occurring in the spindle 13 are difficult to transmit to the table 14 so that a difference in relative displacement between axes is large.

In other words, if the spindle 13 is vibrated due to a certain factor, and the workpiece on the table 14 is relatively fixed, a problem occurs in which a difference in relative displacement between the spindle 13 and the workpiece becomes large, and thus machining accuracy is reduced.

DISCLOSURE

Technical Problem

The present invention provides a 5-axis machining center which simplifies the structure, thereby being capable of reducing production costs and enabling miniaturization.

Further, the present invention provides a 5-axis machining center which minimizes a relative displacement between respective axes during 5-axis machining, thereby being capable of significantly improving machining accuracy.

Further, the present invention provides a machining center for 5-axis processing which may improve the performance of discharging chips generated from a workpiece.

Technical Solution

According to an embodiment of the present invention, a 5-axis machining center includes: a base erected on the ground in a Y-axis direction; a saddle attached to a first lateral surface of the base to be movable in the Y-axis direction; a Z-axis ram coupled to the saddle to be movable in a Z-axis direction and having a spindle capable of mounting a tool on a front end thereof; and an X-axis ram attached to a second lateral surface orthogonal to the first lateral surface of the base, movable in an X-axis direction, and having a table capable of mounting a workpiece on a front end thereof facing the spindle. The table includes: a table body rotatable around an a axis parallel to an X axis; and a table surface rotatable on the table body around a b axis perpendicular to the a axis and allowing the workpiece to be mounted thereon, and the base functions as a column allowing the spindle to be movable thereon and a bed allowing the table to be placed thereon.

In an exemplary embodiment, chips generated from the workpiece free fall to the ground.

In an exemplary embodiment, the base has a third lateral surface between the first lateral surface and the second lateral surface, and the third lateral surface forms a predetermined angle with each of the first lateral surface and the second lateral surface.

In an exemplary embodiment, when the base is viewed from above, a horizontal line passing on the third lateral surface, a Z axis, and the X axis form a triangle.

In an exemplary embodiment, the base includes: a fourth lateral surface being in contact with the first lateral surface; and a fifth lateral surface having one side being in contact with the fourth lateral surface and the other side being in contact with the second lateral surface, and a rib supporting the load of the rams when the rams move linearly is provided on an inner surface of the first lateral surface, the second lateral surface, the fourth lateral surface, or the fifth lateral surface.

In an exemplary embodiment, the rib has an X shape.

In an exemplary embodiment, the 5-axis machining center further includes: a Y-axis guider attached to the first lateral surface in the Y-axis direction to allow the saddle to be linearly movable in the Y-axis direction; a Y-axis motor fixed to a predetermined portion of the base; a Y-axis ball screw rotated by the Y-axis motor, connected to the saddle, and allowing the saddle to move linearly in the Y-axis direction by rotation; a Z-axis guider attached to the saddle in the Z-axis direction and allowing the Z-axis ram to be linearly movable in the Z-axis direction; a Z-axis motor fixed to the Z-axis ram; and a Z-axis ball screw rotated by the Z-axis motor, connected to the saddle, and allowing the Z-axis ram to move linearly in the Z-axis direction by rotation.

In an exemplary embodiment, the 5-axis machining center further includes: an X-axis guider attached to the second lateral surface in the X-axis direction to allow the X-axis ram to be linearly movable in the X-axis direction; an X-axis motor fixed to a predetermined portion of the base; and an X-axis ball screw rotated by the X-axis motor, connected to the X-axis ram, and allowing the X-axis ram to move linearly in the X-axis direction by rotation.

In an exemplary embodiment, the 5-axis machining center further includes a tool magazine provided in a predetermined portion of the base and allowing tools to be mounted on the spindle to be cradled therein.

In an exemplary embodiment, the tool magazine is positioned above the spindle and rotates a plurality of tools around a rotation axis parallel to a Z axis to position a tool desired to be replaced at a specific tool change location.

Advantageous Effects

The present invention has excellent effects as follows.

First, a 5-axis machining center according to the present invention allows one base to function as a bed and a column to simplify the structure, thereby being capable of reducing production costs and minimizing a deterioration in rigidity.

Further, a 5-axis machining center according to the present invention allows vibrations or displacements occurring in any one of rams to be rapidly transmitted to other rams to reduce a difference in displacement between the rams, thereby being capable of significantly improving machining accuracy.

Further, a 5-axis machining center according to the present invention allows chips generated from a workpiece to free fall to the ground without being piled on the apparatus, thereby significantly facilitating collection of the chips.

Further, a 5-axis machining center according to the present invention allows a moving path of force between a tool of a spindle and a workpiece to be minimized, thereby being capable of maximizing dynamic performance.

DESCRIPTION OF DRAWINGS

FIG. 2 is a view showing a 5-axis machining center according to an embodiment of the present invention.

FIG. 3 is a plan view of a 5-axis machining center according to an embodiment of the present invention.

FIG. 4 is a front view of a 5-axis machining center according to an embodiment of the present invention.

BEST MODE

Figure 1:
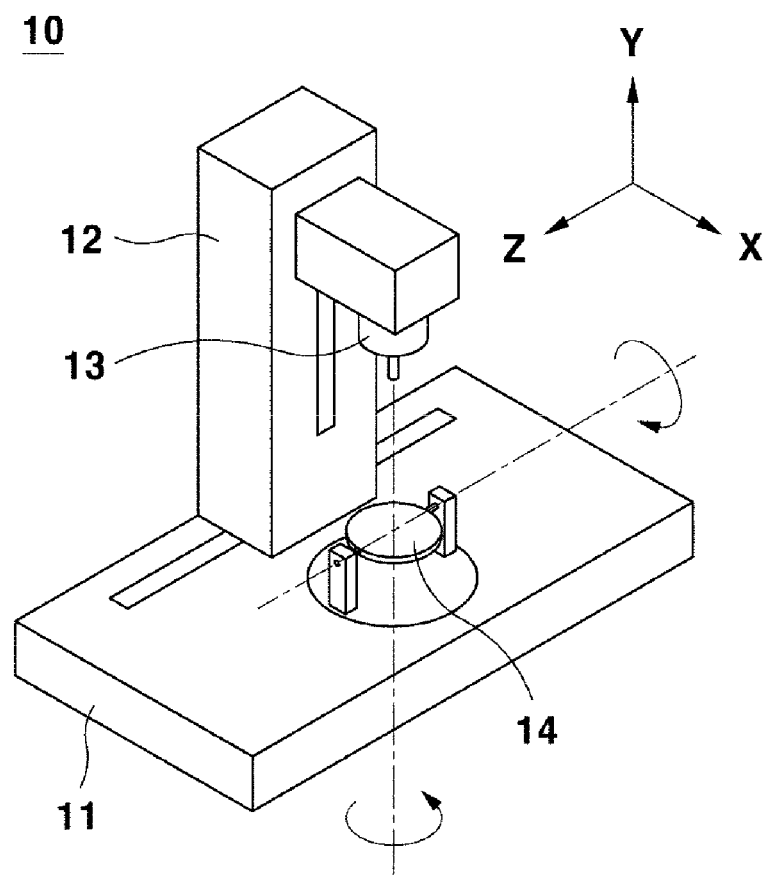
FIG. 1 is a view showing a conventional 5-axis machining center.

The terms used in the present invention have been selected from the general terms that are now in wide use, but in certain cases, there are terms arbitrarily selected by the applicant. In these cases, the meaning should be understood in consideration of that described or used in the detailed description of the invention rather than the name of a simple term.

Hereinafter, the technical features of the present invention will be described in detail with reference to exemplary embodiments illustrated in the accompanying drawings.

However, the present invention is not limited to the embodiments described herein but may be embodied in other forms. Like reference numerals denote like elements throughout the specification.

FIG. 2 is a view showing a 5-axis machining center according to an embodiment of the present invention. FIG. 3 is a plan view of a 5-axis machining center according to an embodiment of the present invention. FIG. 4 is a front view of a 5-axis machining center according to an embodiment of the present invention.

Referring to FIGS. 2 and 4, a 5-axis machining center 100 (hereinafter referred to as a "machining center") includes a base 110, a saddle 120, a Z-axis ram 130, and an X-axis ram 140, a spindle 131 capable of mounting a tool is provided on a front end of the Z-axis ram 130, and a table 150 capable of mounting a workpiece is provided on a front end of the X-axis ram 140.

Further, the base 110 is a structure for supporting other constituent elements and is erected on the ground.

Further, the base 110 has the shape of a pentagonal pillar and has a first lateral surface 111, a second lateral surface 112, a third lateral surface 113, a fourth lateral surface 114, and a fifth lateral surface 115.

Further, the first lateral surface 111 is in contact with the fourth lateral surface 114, the fourth lateral surface 114 is in contact with the fifth lateral surface 115, and the second lateral surface 112 is in contact with the fifth lateral surface.

Further, the third lateral surface 113 has one side being in contact with the first lateral surface 111 and the other side being in contact with the second lateral surface 112.

Further, the first lateral surface 111 and the fourth lateral surface 114, the fourth lateral surface 114 and the fifth lateral surface 115, and the fifth lateral surface 115 and the second lateral surface 112 may form an angle of 90 degrees with each other, and the first lateral surface 111 and the third lateral surface 113, and the second lateral surface 112 and the third lateral surface 113 may form an angle of 135 degrees with each other.

However, the angles formed by the lateral surfaces are not necessarily limited to the aforementioned angles.

Merely, when points, at which a horizontal line h passing on the third lateral surface 113, an X axis, and a Y-axis meet, are connected, a triangle t is formed.

This is for the purpose of preventing the table 150, the spindle 131, or the workpiece from interfering with the base 110 when the workpiece is machined between the first lateral surface 111 and the second lateral surface 112 and for the purpose of transmitting a force generated when the Z-axis ram 130 or the X-axis ram 140 to be described below is driven to other rams along the third lateral surface 113 to minimize a moving path of the force, thereby maximizing dynamic performance.

The saddle 120 is coupled to the first lateral surface 111 of the base 110 and moves in a Y-axis direction.

Further, a Y-axis guider 160 fastening the first lateral surface 111 and the saddle 120 to each other and allowing the saddle 120 to be linearly movable in the Y-axis direction is provided on the first lateral surface 111.

For example, the Y-axis guider 160 may be a linear motion (LM) guide.

Further, a Y-axis motor 161 is provided on an upper end of the base 110, and a rotary shaft of the Y-axis motor 161 and the saddle 120 are connected to each other using a Y-axis ball screw 162.

Further, the Y-axis ball screw 162 has one side coupled to the rotary shaft of the Y-axis motor 161 and the other side screwed to the saddle 120.

That is, rotation of the Y-axis ball screw 162 allows the saddle 120 to be linearly movable in the Y-axis direction.

Further, a clutch capable of adjusting power transmission may be provided between the one side of the Y-axis ball screw 162 and the rotary shaft of the Y-axis motor 161.

The Z-axis ram 130 is coupled to the saddle 120 to be linearly movable thereon in a Z-axis direction.

Further, the saddle 120 has a Z-axis guider 163 fastening the Z-axis ram 130 such that the Z-axis ram 130 is movable in the Z-axis direction.

Further, the Z-axis guider 163 may be a LM guide.

Further, the spindle 131 capable of mounting the tool able to machine the workpiece and rotating the mounted tool is provided on the front end of the Z-axis ram 130.

Further, a Z-axis motor 164 is provided on a rear end of the Z-axis ram 130, and a rotary shaft of the Z-axis motor 164 and the saddle 120 are connected through a Z-axis ball screw 165.

That is, locations of the Z-axis ram 130, the Z-axis motor 164, and the Z-axis ball screw 165 are relatively fixed with respect to each other.

Further, the Z-axis ball screw 165 has one side connected to the rotary shaft of the Z-axis motor 164 and the other side screwed to the saddle 120.

That is, when the Z-axis ball screw 165 rotates, the Z-axis ball screw 165 moves linearly on the saddle 120 in the Z-axis direction, and movement of the Z-axis ball screw 165 allows the Z-axis ram 130 to move linearly in the Z-axis direction.

Further, a clutch capable of adjusting the power of the Z-axis motor 164 to the Z-axis ball screw 165 may be provided between the Z-axis motor 164 and the Z-axis ball screw 165.

Further, although not illustrated, a motor for rotating the spindle 131 may be provided inside the Z-axis ram 130.

The X-axis ram 140 is attached to the second lateral surface 112 of the base 110 to be linearly movable in the X-axis direction and has the table 150 capable of mounting the workpiece provided on the front end thereof facing the spindle 131.

Further, the table 150 includes a table body 151 rotatable around an a axis parallel to a Z axis, and a table surface 152 rotatable on the table body 151 around a b axis perpendicular to the a axis and capable of mounting the workpiece, on a front end of the Z-axis ram 140.

That is, the machining center 100 according to the present invention allows the Z-axis ram 130 to be linearly movable in the Y- and Z-axis directions, allows the X-axis ram 140 to be movable in the X-axis direction, and allows the table 150 to be able to rotate the workpiece around the a and b axes, thereby enabling 5-axis machining.

Further, as illustrated in FIG. 4, other structures are not present below the table 150.

That is, since chips generated when the workpiece cradled on the table 150 is machined free fall to the ground in a vertically downward direction f, the chips may be easily collected.

Further, as illustrated in FIG. 3, the table surface 152 has a lower end positioned adjacent to the a axis, which is the axis of rotation of the table body 151.

This means that an offset distance d, which is a distance between an upper end of the table surface 152 and the a axis, may be minimized, and as a location of the workpiece becomes close to the a axis, dynamic behavior performance may be increased.

Further, an X-axis guider 170 attached to the second lateral surface 112 of the base 110 in the X-axis direction and connected to the X-axis ram 140 to allow the X-axis ram 140 to be linearly movable in the X-axis direction is provided on the second lateral surface 112 of the base 110.

Further, the X-axis guider 170 may be a LM guide.

Further, an X-axis motor 171 is provided on a lateral surface of the base 110, and a rotary shaft of the X-axis motor 171 and the X-axis ram 140 are connected through an X-axis ball screw (not illustrated).

That is, one side of the X-axis ball screw is connected to the rotary shaft of the X-axis motor 171, the other side is screwed to the X-axis ram 140, and when the X-axis ball screw rotates, the X-axis ram 140 moves linearly in the X-axis direction.

Here, the reason that the X-axis ball screw is directly fastened to the X-axis ram 140 without using an additional saddle is for the purpose of minimizing a distance between the X axis and the a axis, thereby increasing dynamic behavior performance.

Further, a clutch capable of adjusting power transmission may be provided between the rotary shaft of the X-axis motor 171 and the X-axis ball screw.

Thus, the machining center 100 according to an embodiment of the present invention allows one base 110 to function as a bed 11 and a column 12, compared to a conventional machining center 10, thereby being capable of simplifying the structure of the apparatus and reducing the volume thereof.

Further, the machining center 100 according to an embodiment of the present invention allows the Z-axis ram 130 and the X-axis ram 140 to be connected together to the base 110 to allow vibrations or (thermal) displacements occurring in any one ram thereof to be rapidly transmitted to the other ram such that a difference in relative position, displacement, or temperature between the rams is minimized, thereby being capable of significantly improving machining accuracy.

Further, although not illustrated, the machining center 100 according to an embodiment of the present invention may further have ribs provided on inner surfaces of the first, second, third, fourth, and fifth lateral surfaces 111, 112, 113, 114, and 115, and when the Z-axis ram 130 and the X-axis ram 140 are driven, the ribs support the load thereof to prevent warping of the base 110.

Further, the ribs may be all provided on the respective lateral surfaces of the base 110 or may be selectively provided on only a specific surface thereof.

Further, the ribs may have an X shape, which may support the load even when the rams 130 and 140 move linearly in any direction and allows a force generated in the ribs to be able to be concentrated on the X, Y, or Z axis, thereby being capable of improving dynamic performance.

Further, although not illustrated, the machining center 100 according to an embodiment of the present invention may further have a tool magazine provided on an upper end of the base 110 and allowing tools to be mounted on the spindle 131 to be cradled thereon.

Further, the tool magazine is provided in a circular shape, may rotate around a C axis parallel to the Z axis, and allows the tools to be radially cradled on the outer periphery thereof.

Further, the tool magazine rotates around the C axis to position a specific tool at a desired tool change location and then allow the tool to be mounted on the spindle 131 or the mounted tool to be replaceable.

INDUSTRIAL APPLICABILITY

As discussed above, the present invention provides a machining center for 5-axis processing which simplifies the structure, thereby being capable of reducing production costs and enabling miniaturization.

The present invention is not limited by the aforementioned embodiments and the accompanying drawings, and it will be apparent to those skilled in the art that various substitutions, modifications, and equivalent other embodiments can be made without departing from the scope of the invention.

The invention claimed is:

1. A 5-axis machining center comprising:
   a base that has the shape of a pentagonal pillar including a first lateral surface, a second lateral surface, a third lateral surface, a fourth lateral surface, and a fifth lateral surface, and that is erected on the ground in a Y-axis direction;
   a saddle attached to the first lateral surface of the base to be movable in the Y-axis direction;
   a Z-axis ram coupled to the saddle to be movable in a Z-axis direction;
   a spindle coupled to a front end of the Z-axis ram horizontally with the Z-axis ram, capable of mounting a tool and rotating a mounted tool, the spindle moving along with the tool in the Y-axis direction and the Z-axis direction outside the base; and
   an X-axis ram attached to the second lateral surface orthogonal to the first lateral surface of the base to be movable in an X-axis direction;
   a table coupled to a front end of the X-axis ram horizontally with X-axis ram and capable of mounting a workpiece, the table moving along with the workpiece in the X-axis direction outside the base,
   wherein a triangle (t) occurs at the intersection of a horizontal line (h) passing on the third lateral surface between the first lateral surface and the second lateral surface, an X axis, and a Z axis such that a space in which the workpiece is machined is formed in front of the third lateral surface, the table includes a table body rotatable around an a axis parallel to the X axis, and a table surface rotatable on the table body around a b axis perpendicular to the a axis and allowing the workpiece to be mounted thereon, and other structures are not formed below the table to allow chips generated when the workpiece is machined to free fall to the ground.

* * * * *